(12) United States Patent
Zhang et al.

(10) Patent No.: US 10,521,888 B2
(45) Date of Patent: Dec. 31, 2019

(54) AEROTHERMAL RADIATION EFFECT FREQUENCY DOMAIN CORRECTION METHOD

(71) Applicant: Huazhong University of Science and Technology, Wuhan (CN)

(72) Inventors: Tianxu Zhang, Wuhan (CN); Xuan Hou, Wuhan (CN); Chuan Zhang, Wuhan (CN); Li Liu, Wuhan (CN); Quan Chen, Wuhan (CN); Ao Zhong, Wuhan (CN); Mingxing Xu, Wuhan (CN); Yutian Zhou, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 16/359,990

(22) Filed: Mar. 20, 2019

(65) Prior Publication Data

US 2019/0220958 A1 Jul. 18, 2019

Related U.S. Application Data

(63) Continuation-in-part of application No. 15/577,335, filed as application No. PCT/CN2016/079135 on Apr. 13, 2016, now abandoned.

(30) Foreign Application Priority Data

Dec. 23, 2015 (CN) .......................... 2015 1 0995105

(51) Int. Cl.
  *G06K 9/00* (2006.01)
  *G06T 5/00* (2006.01)
  (Continued)

(52) U.S. Cl.
  CPC ................ *G06T 5/002* (2013.01); *G06T 5/10* (2013.01); *G06T 5/20* (2013.01); *G06T 5/40* (2013.01);
  (Continued)

(58) Field of Classification Search
  CPC combination set(s) only.
  See application file for complete search history.

(56) References Cited

U.S. PATENT DOCUMENTS 9,904,987 B2 * 2/2018 Li ......................... G06T 3/4007
10,127,641 B2 * 11/2018 Zhang ..................... G06T 5/002
(Continued)

FOREIGN PATENT DOCUMENTS

CN 103093425 A * 5/2013
CN 105118037 A * 12/2015

*Primary Examiner* — Jose L Couso
(74) *Attorney, Agent, or Firm* — Matthias Scholl P.C.; Matthias Scholl

(57) ABSTRACT

An aerothermal-radiation correction method, including: using a Gaussian surface to approximate a thermal radiation noise, performing a Fourier transform on the Gaussian surface so as to obtain a centralized spectrum of the thermal radiation noise, constructing a filter function H based on the centralized spectrum of the thermal radiation noise; performing a Fourier transform on the aerothermal-radiation degraded image f so as to obtain a centralized spectrum F, taking dot product of F and H to obtain a filtered spectrum G; and performing an inverse Fourier transform on filtered spectrum G to obtain a modulus, and acquire a corrected image. The method effectively removes background noise generated by aerothermal radiation, greatly improves image quality and image signal-to-noise ratio. The method features reduced computational complexity and a shorter operation time, and is suited for real-time processing.

8 Claims, 25 Drawing Sheets

(51) Int. Cl.
*G06T 5/10* (2006.01)
*G06T 5/20* (2006.01)
*G06T 5/40* (2006.01)
*G06T 7/136* (2017.01)

(52) U.S. Cl.
CPC .... *G06T 7/136* (2017.01); *G06T 2207/10032* (2013.01); *G06T 2207/10048* (2013.01); *G06T 2207/20021* (2013.01); *G06T 2207/20024* (2013.01)

(56) References Cited

U.S. PATENT DOCUMENTS

| | | | | |
|---|---|---|---|---|
| 10,297,013 B2 * | 5/2019 | Zhang | ............. | G06T 5/002 |
| 2010/0329583 A1 * | 12/2010 | Whiteside | ............. | G06T 5/002 |
| | | | | 382/260 |
| 2016/0006936 A1 * | 1/2016 | Hattori | ............. | H04N 5/23267 |
| | | | | 382/166 |
| 2017/0094255 A1 * | 3/2017 | Zabatani | ............. | G06F 3/0488 |

\* cited by examiner

AEROTHERMAL RADIATION EFFECT FREQUENCY DOMAIN CORRECTION METHOD

CROSS-REFERENCE TO RELATED APPLICATIONS

This application is a continuation-in-part of and claims domestic priority to U.S. patent application Ser. No. 15/577,335, filed Nov. 27, 2017, now pending, which is a National Stage Appl. filed under 35 USC 371 of International Patent Application No. PCT/CN2016/079135 with an international filing date of Apr. 13, 2016, designating the United States, and further claims foreign priority benefits to Chinese Patent Application No. 201510995105.X filed Dec. 23, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The present disclosure relates to the technical field of interdisciplinary sciences combining image processing and aerospace technology, and more particularly to a method for correcting for aerothermal radiation based on frequency-domain.

Description of the Related Art

Development of supersonic aircraft has become an important direction in the aerospace technology worldwide, and is of very high level of strategic importance in the fields of politics, military, and economics. However, the development of supersonic aircraft faces a series of problems related to aero-optical effects, such as deteriorated imaging quality of images acquired by an image sensor and a large reduction of signal-to-noise ratio.

Aerothermal radiation effect generally refers to the following phenomena: when a high-speed aircraft carrying an optical imaging and detection system flies in the atmosphere, a complex flow field is produced due to interaction between an optical window and incoming airflow. Due to the impact of air viscosity, the airflow in contact with the surface of the optical window will be retarded, resulting in a decrease of the airflow velocity and a formation of a boundary layer near the surface of the optical window. Within the boundary layer, the airflow layers having a relatively large velocity gradient will produce strong friction, which irreversibly converts kinetic energy of the airflow into thermal energy, causing rise of the temperature on the walls of the optical window. The high-temperature airflow will continuously transfer heat to the low-temperature walls, causing strong aerothermal heating and thus bringing radiation interference to an imager. This increases the background brightness of an infrared image, deteriorates quality of infrared imaging, and significantly affects navigation, positioning and detection performances of a supersonic aircraft.

Although some aerothermal-radiation-effect correction methods have been reported in related documents or patents, these methods are problematic because they require complex and time-consuming computations (e.g., matrix computations and iterative computations) or because they provide only one modeling method, and thus these methods are inapplicable to real-time processing. For example, the method in CN105160687A requires complex matrix computations, and thus it requires a relative long time for the correction of aerothermal radiation. Therefore, there is an urgent need in the art to provide a real-time correction method.

SUMMARY OF THE INVENTION

In view of the above-described problems, it is one objective of the invention to provide a method for correcting the aerothermal radiation based on the frequency domain. The method analyzes spectral distribution of thermal noise in the aerothermal-radiation degraded image to establish a filter, and filters out the spectral components for the aerothermal-radiation noise from the aerothermal-radiation degraded image in the frequency domain to restore a clear image, thereby significantly improving quality and signal-to-noise ratio of the image. Therefore, the method is particularly suitable for applications in high-speed flight of supersonic aircraft for removing the aerothermal radiation effect and the like.

To achieve the above objective, in accordance with one embodiment of the invention, there is provided a method for correcting aerothermal radiation based on frequency-domain, the method comprising:

1) acquiring an aerothermal-radiation degraded image f from an image storage device;
2) transmitting the aerothermal-radiation degraded image f from the image storage device to a processor via a field-programmable gate array (FPGA), and constructing a Gaussian curved-surface b that represents a spectral distribution of the aerothermal-radiation noise in the aerothermal-radiation degraded image f in the processor; transmitting the Gaussian curved-surface b from the processor to a Fourier-transform chip via the FPGA, and obtaining a spectrum of the aerothermal-radiation noise in the Fourier-transform chip by performing Fourier transform to the Gaussian curved-surface b; and transmitting the spectrum of the aerothermal-radiation noise from the Fourier-transform chip to the processor via the FPGA, and obtaining a centralized spectrum B of the aerothermal-radiation noise in the processor by performing spectrum centralization to the spectrum of the aerothermal-radiation noise;
3) establishing a filter function H in the processor based on the centralized spectrum B of the aerothermal-radiation noise;
4) transmitting the aerothermal-radiation degraded image f from the image storage device to the Fourier-transform chip via the FPGA, and obtaining a spectrum of the aerothermal-radiation degraded image f by performing Fourier transform to the aerothermal-radiation degraded image f in the Fourier-transform chip; transmitting the spectrum of the aerothermal-radiation degraded image f from the Fourier-transform chip to the processor via the FPGA, and obtaining a centralized spectrum F of the aerothermal-radiation degraded image f in the processor by performing spectrum centralization to the spectrum of the aerothermal-radiation degraded image f;
5) filtering out the spectral components for the aerothermal-radiation noise from the centralized spectrum F of the aerothermal-radiation degraded image f in the processor by performing dot-product of the centralized spectrum F of the aerothermal-radiation degraded image f and the filter function H, to yield a filtered spectrum G of a real-time image; and 6) obtaining a centralized filtered spectrum of the real-time image in the processor by performing spectrum centralization to the filtered spectrum G of the real-time image; transmitting the centralized filtered spectrum of the real-time image from the processor to the Fourier-transform chip via the FPGA, and obtaining image data for the aerothermal-radiation corrected image in the Fourier-transform chip by performing inverse Fourier transform to the centralized filtered spectrum of the real-time image; and transmitting the image data for the aerothermal-radiation corrected image from the Fourier-transform chip to the processor via the FPGA, and obtaining the aerothermal-radiation corrected image in the processor by performing modulo operations to the image data for the aerothermal-radiation corrected image;

in the method, the spectrum centralization to a spectrum comprises: a) obtaining an amplitude spectrum for the spectrum by calculating the magnitude of the spectrum; b) equally dividing the amplitude spectrum into a 2×2 sub-blocks; and c) interchanging every two diagonal sub-blocks of the 2×2 sub-blocks.

In a class of this embodiment, step 2) comprises: first acquiring a size m×n of the aerothermal-radiation degraded image f; then constructing the Gaussian curved-surface b in the same size as the aerothermal-radiation degraded image f by using a Gaussian function $$\text{gaussian}(m, n) = e^{\frac{-(m^2+n^2)}{2\sigma^2}},$$

in which m and n represent the rows and columns of the two-dimensional Gaussian function, respectively, and $\sigma$ represents the standard deviation.

In a class of this embodiment, step 3) comprises:

(3-1) obtaining an amplitude spectrum $\overline{B}$ of the centralized spectrum B of the aerothermal-radiation noise, wherein $\overline{B}=|B|$;

(3-2) normalizing the amplitude spectrum $\overline{B}$ to obtain a normalized amplitude spectrum N, and drawing a statistical histogram Hist(x) thereof, wherein the abscissa x represents a normalized amplitude value;

(3-3) according to the histogram Hist(x), estimating a segmentation threshold $\gamma$, and then using the segmentation threshold $\gamma$ to segment the normalized amplitude spectrum N, wherein a value of $\gamma$ is in the range of 0-1;

(3-4) based on the segmentation threshold $\gamma$, performing threshold-based segmentation of the normalized amplitude spectrum N, thus obtaining a filtering-mask constraint BW; and (3-5) based on the obtained filtering-mask constraint BW, establishing a corresponding filter function H, which specifically is as follows:

$$H(u, v) = \begin{cases} 1 & BW(u, v) = 1 \\ \lambda & BW(u, v) = 0 \end{cases}$$

wherein, BW(u,v) represents an arbitrary point on BW; H(u,v) represents an arbitrary point on the filter function H, and (u,v) represents coordinates of the point; $\lambda$ represents the degree in which the aerothermal-radiation noise is filtered out, and its value in the range of 0-1.

In a class of this embodiment, segmenting the normalized amplitude spectrum N to obtain the filtering-mask constraint BW comprises: for every point $\overline{N(u,v)}$ in the normalized amplitude spectrum N, if $\overline{N(u,v)} \geq \gamma$, then setting the corresponding point in the filtering-mask constraint BW to be $\overline{BW(u,v)}=0$; otherwise, setting BW(u,v)=1.

In a class of this embodiment, the filtering-mask constraint is a binary-mask constraint.

In general, compared with the prior art, the method for correcting for aerothermal radiation of the present disclosure mainly have the following technical advantages:

1. In the present application, in conjunction with the practical need for frequency-domain correction of aerothermal radiation effect, and in view of the problem of deteriorated real-time performance of algorithms due to complex matrix operations and repeated iterations and the like in the existing frequency-domain correction methods for aerothermal radiation effect, a novel method for correcting for aerothermal radiation based on frequency-domain is proposed, which only requires one time of Fourier transform and inverse Fourier transform to images to accomplish the entire correction procedure, and greatly enhances signal-to-noise ratio of images while effectively suppressing aerothermal radiation noise. In addition, the time-consuming computations of the method (Fourier transform and inverse Fourier transform) are conducted in an individual Fourier-transform chip that is disposed out of the processor. Therefore, the method reduces the computation burden on the processor and highly increases the computation efficiency, and thus the method has the feature of high-level real-time performance.

2. Moreover, in the method of the present disclosure, a filter is established by analyzing spectrum distribution of aerothermal radiation noise, then the filter is used to filter out the spectral components of the aerothermal radiation noise in frequency-domain to restore a clear image; in this way, the method not only ensures significant improvement in quality and signal-to-noise ratio of images, but also reduces computational complexity of the correction method as much as possible, thereby significantly reduces the time consumption for correction.

DETAILED DESCRIPTION OF THE PREFERRED EMBODIMENTS

To better explain the present disclosure, the main contents of the present disclosure are further set forth below by use of specific examples, but the contents of the present disclosure are not limited to the examples below.

The method of the present disclosure, through comparison and analysis of a series of aerothermal-radiation degraded images and original reference images, as shown in FIGS. 7-12, finds out that aerothermal-radiation noise in an aerothermal-radiation degraded image is in a low-frequency distribution, with a shape similar to a Gaussian curved-surface, and its spectral distribution is regular and ordered, in a "cross" shape which has a tendency to gradually attenuate towards the surrounding area.

Thus, it is known from the above analysis that, aerothermal-radiation noise can be approximated by a Gaussian curved-surface, which will be described below in detail.

Figure 1:
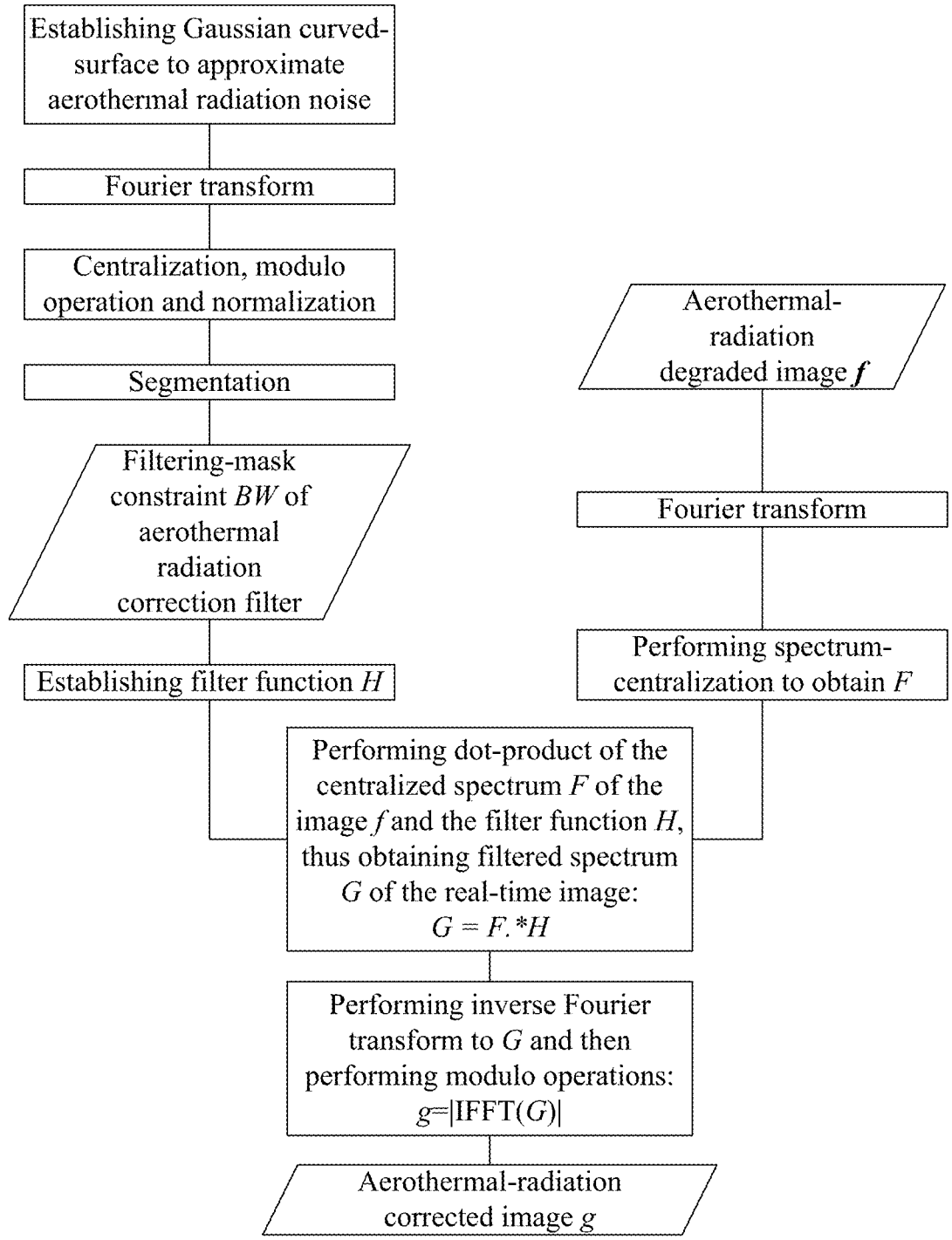
FIG. 1 is a flowchart of the method for correcting for aerothermal radiation based on the frequency domain, according to the present disclosure.
Figure 2:
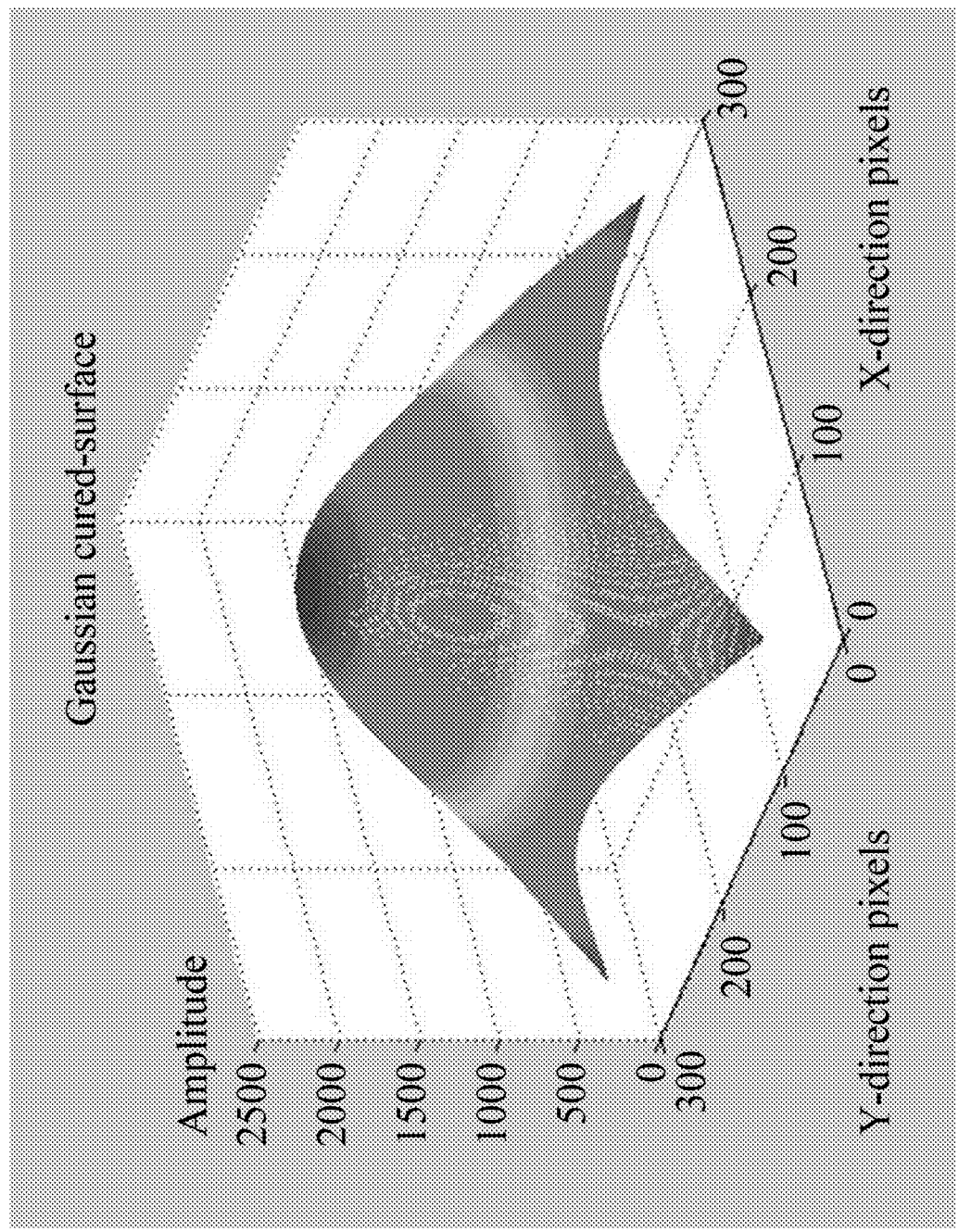
FIG. 2 shows an aerothermal-radiation-noise Gaussian curved-surface obtained by approximation processing.
Figure 4:
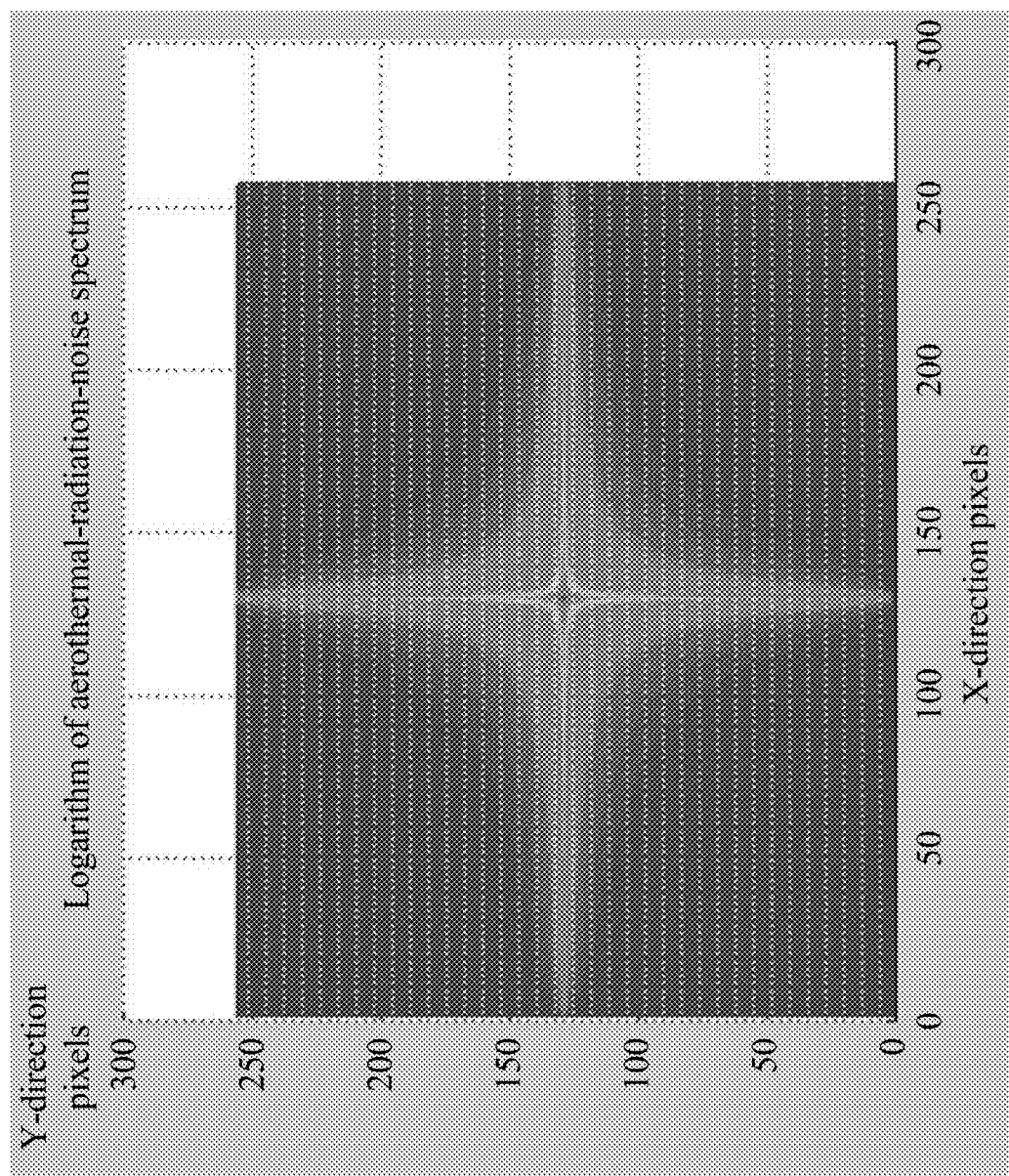
FIG. 4 shows the amplitude spectrum of the aerothermal-radiation-noise Gaussian curved-surface of FIG. 2.
Figure 9:
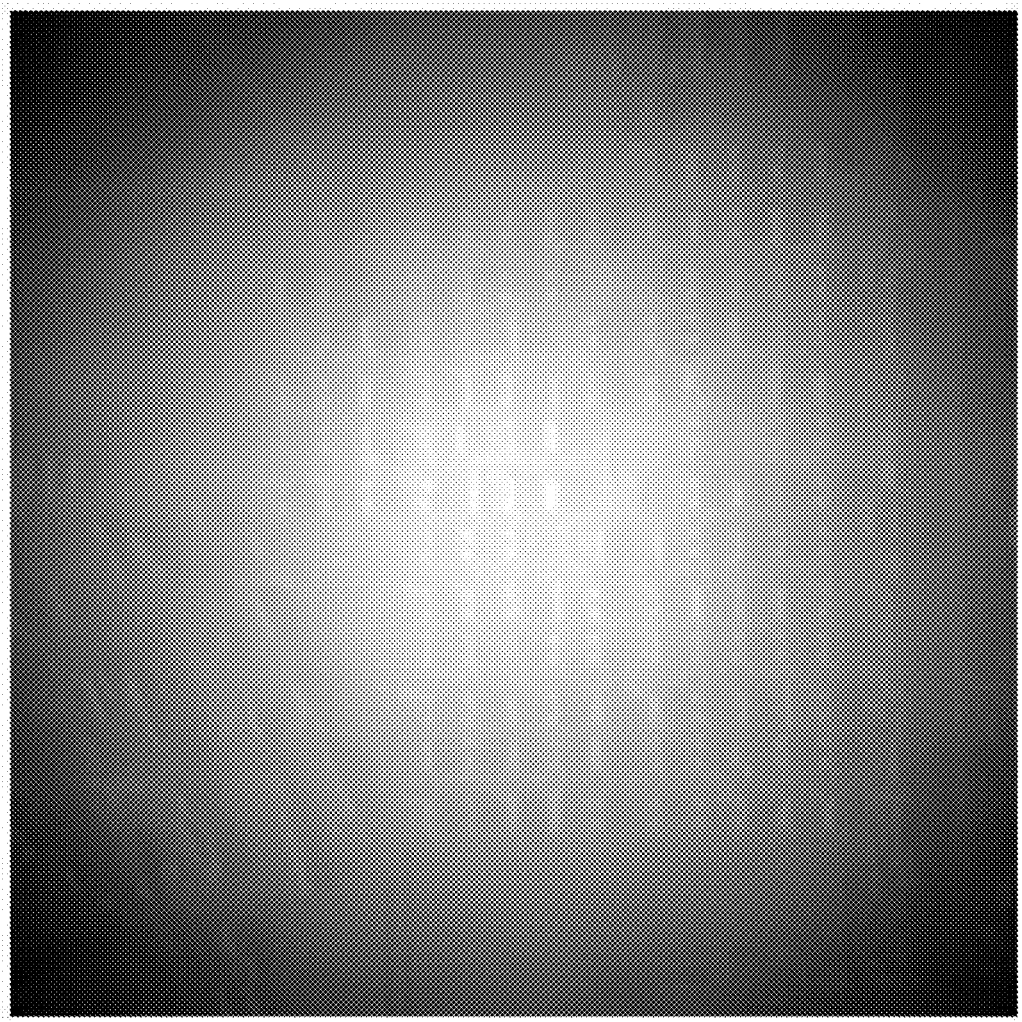
FIG. 9 shows an acquired aerothermal-radiation degraded image f.

As shown in FIG. 1, it shows a flowchart of the method for correcting the aerothermal radiation based on the frequency domain, according to the present disclosure, and the method comprises the following steps:

(1) acquiring an aerothermal-radiation degraded image f from video images stored in a real-time video image library of an image storage device, as shown in FIG. 9;

(2) approximating an aerothermal-radiation-noise Gaussian curved-surface b that represents a spectral distribution of the aerothermal-radiation noise in the aerothermal-radiation degraded image f, obtaining a spectrum of the aerothermal-radiation noise by performing Fourier transform to the Gaussian curved surface b, and obtaining a centralized spectrum B of the aerothermal-radiation noise by performing spectrum centralization to the spectrum of the aerothermal-radiation noise;

Step (2) comprises: firstly, acquiring the size m×n of the aerothermal-radiation degraded image used in step (1); next, establishing an aerothermal-radiation-noise Gaussian curved-surface b in the same size as the degraded image, as shown in FIG. 2, by using a Gaussian function $$\text{gaussian}(m, n) = e^{\frac{-(m^2+n^2)}{2\sigma^2}},$$

wherein, m and n represent the rows and columns of the two-dimensional Gaussian function, respectively, and σ represents the standard deviation; then, performing Fourier transform to the Gaussian curved-surface b to obtain a spectrum of the aerothermal-radiation noise, finally, performing spectrum centralization to the spectrum of the aerothermal-radiation noise to obtain the centralized spectrum B of the aerothermal-radiation noise, with the result shown in FIG. 4.

Figure 3:
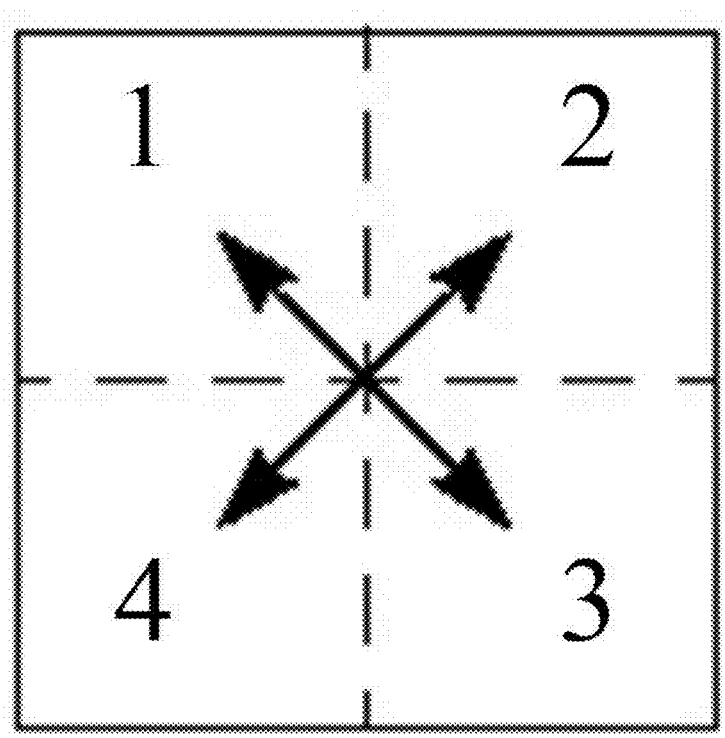
FIG. 3 is a schematic diagram illustrating the spectrum-centralization processing.

Specifically, the spectrum centralization with respect to the spectrum of the aerothermal-radiation noise to obtain the centralized spectrum B of the aerothermal-radiation noise is as follows: first, the amplitude spectrum is obtained for the spectrum of the aerothermal-radiation noise, wherein the amplitude spectrum is the magnitude of the spectrum of the aerothermal-radiation noise; then, the amplitude spectrum in FIG. 3 is equally divided into 2×2 sub-blocks, and then, spectrum centralization can be realized by exchanging the first sub-block 1 with the third sub-block 3, wherein the first sub-block 1 and the third sub-block 3 are diagonal with respect to each other as shown in FIG. 3, and exchanging the second sub-block 2 with the fourth sub-block 4, wherein the second sub-block 2 and the fourth sub-block 4 are diagonal with respect to each other as shown in FIG. 3. The centralized spectrum B of the aerothermal-radiation noise has low frequencies distributed at the center and high frequencies distributed in the surrounding area.

(3) acquiring a filtering-mask constraint BW from the centralized spectrum B of the aerothermal-radiation noise obtained in step (2), and establishing a filter function H based on the filtering-mask constraint BW;

Step (3) comprises:

(3-1) calculating amplitude spectrum $\overline{B}$ of the centralized spectrum B of the aerothermal-radiation noise obtained in step (2), $\overline{B}=|B|$;

(3-2) normalizing the amplitude spectrum $\overline{B}$ to obtain a normalized amplitude spectrum N, and drawing a statistical histogram Hist(x) thereof, wherein the abscissa x represents a normalized amplitude value;

(3-3) according to the histogram Hist(x), estimating a segmentation threshold γ, and then using the segmentation threshold γ to segment the normalized amplitude spectrum N, thus obtaining the filtering-mask constraint BW, wherein the filtering-mask constraint BW is binary-mask constraint; the segmentation threshold γ indicates the amount of the filtered-out spectral components, and its value is in the range of 0-1; the greater γ, the more spectral components are filtered out, and in one embodiment, γ=0.55.

Figure 5:
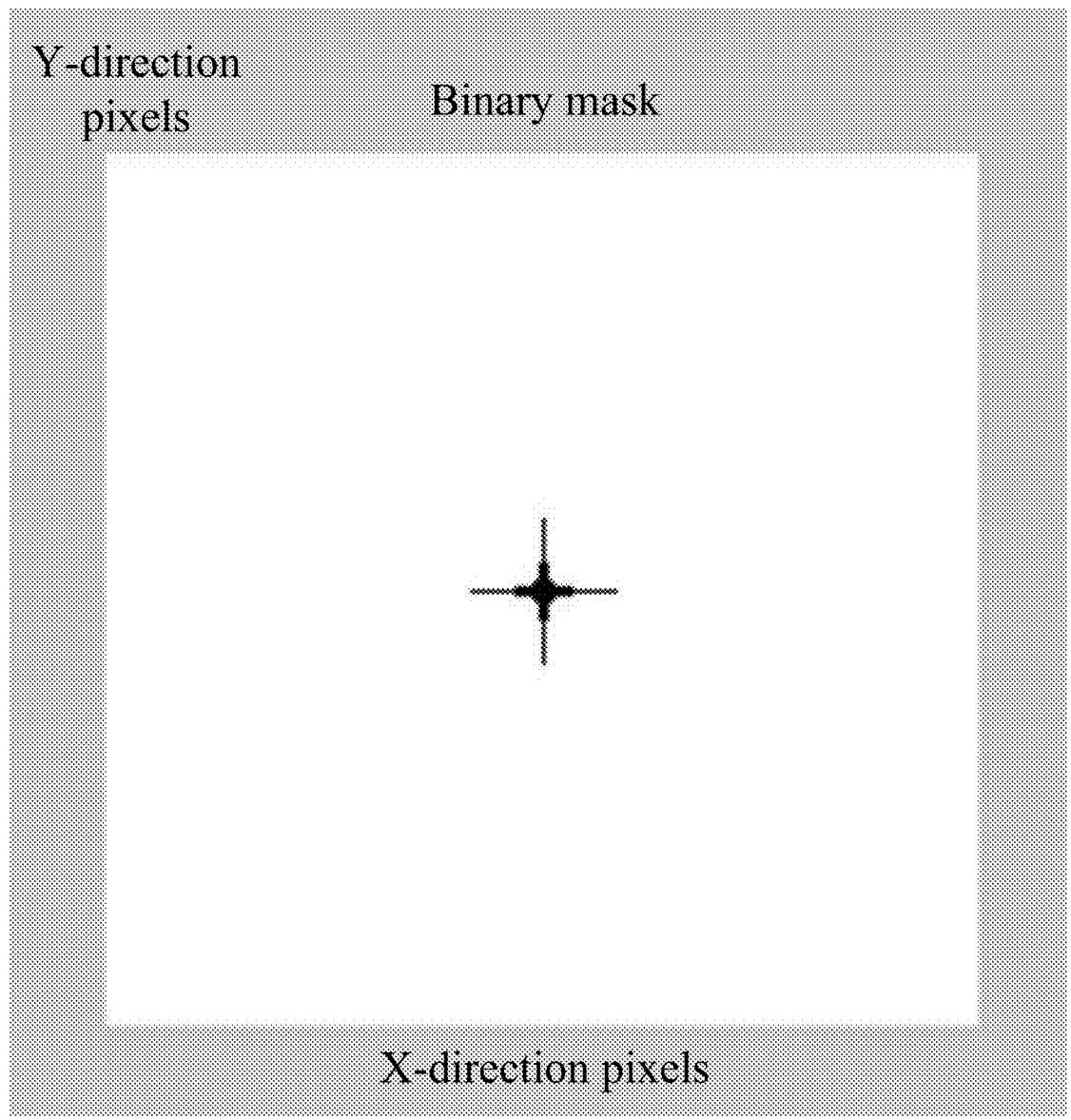
FIG. 5 shows filtering-mask constraint BW of the filter function H.
Figure 6:
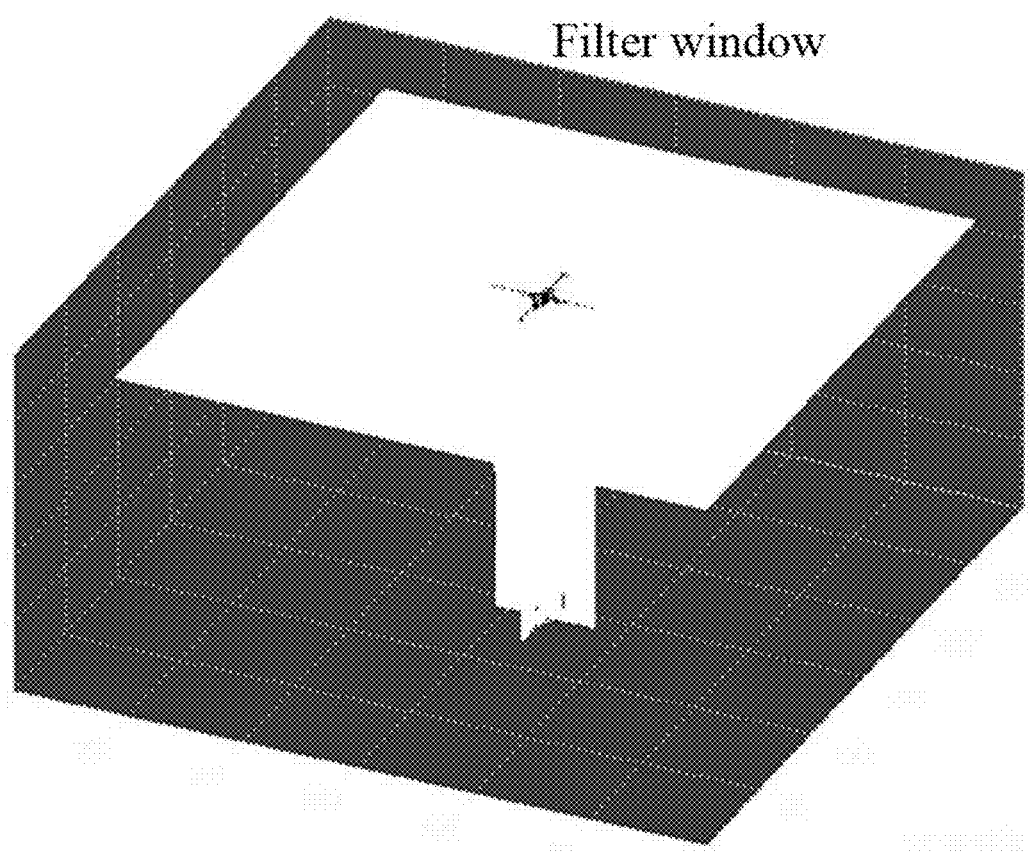
FIG. 6 shows a three-dimensional view of the filter function H.
Figure 7:
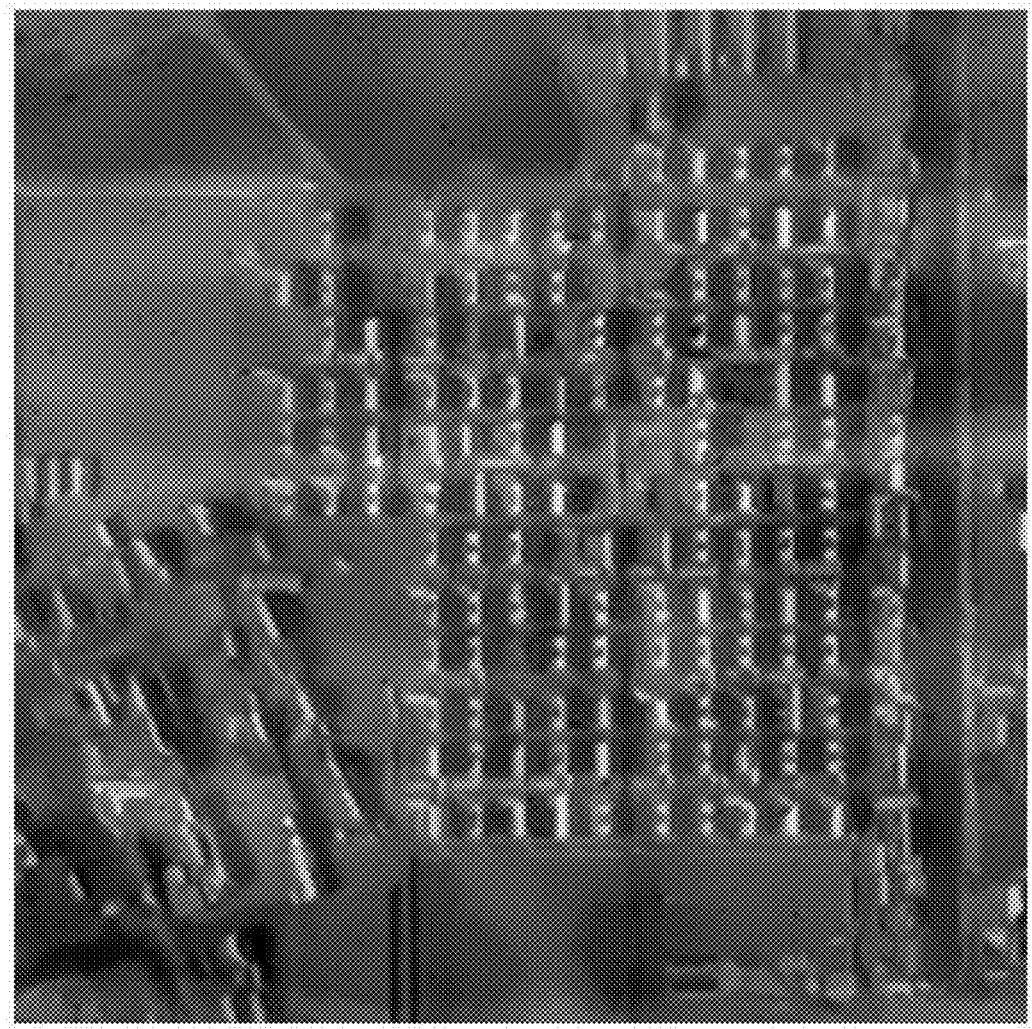
FIG. 7 is a reference image.
Figure 8:
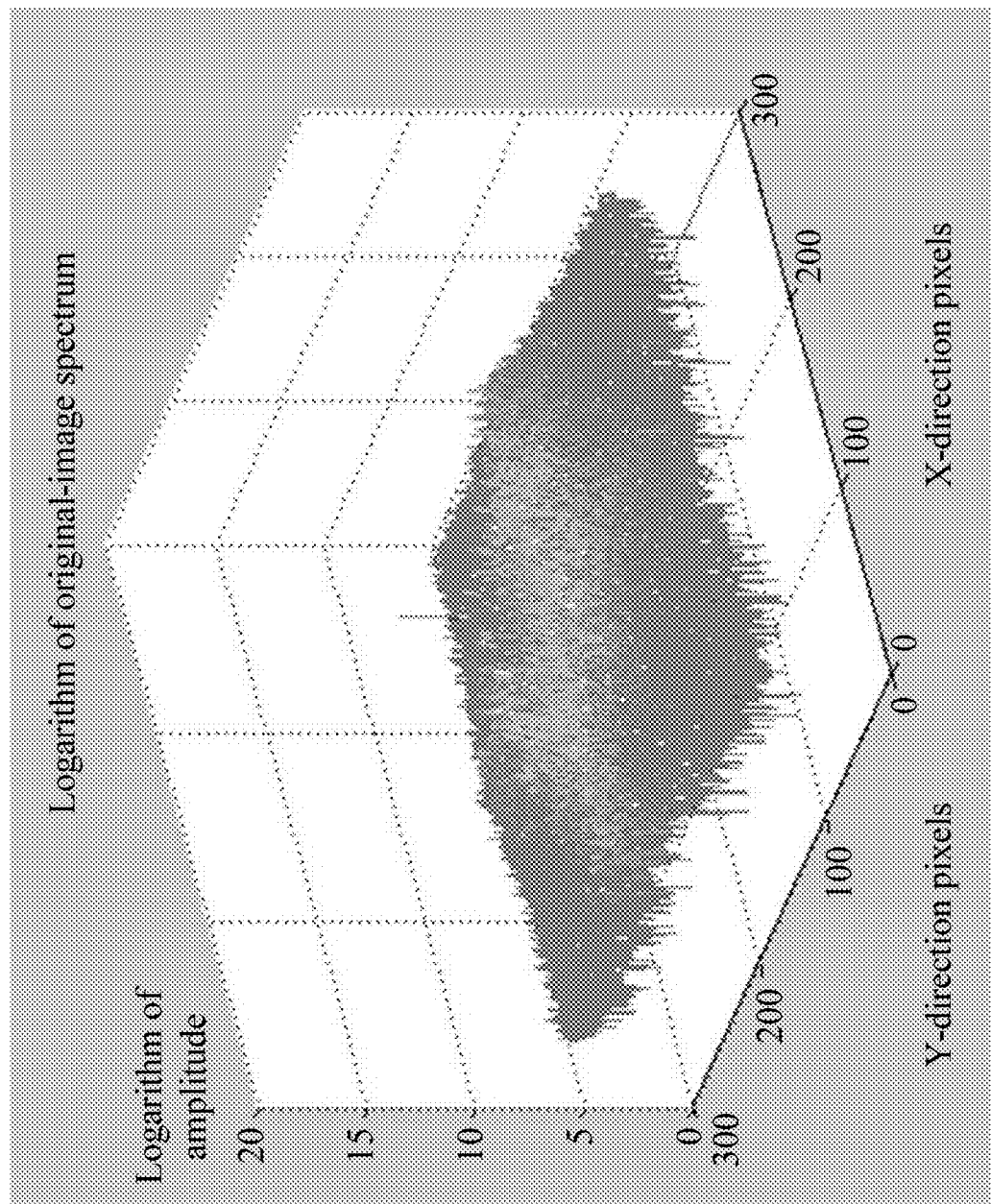
FIG. 8 shows the centralized spectrum of the reference image.
Figure 10:
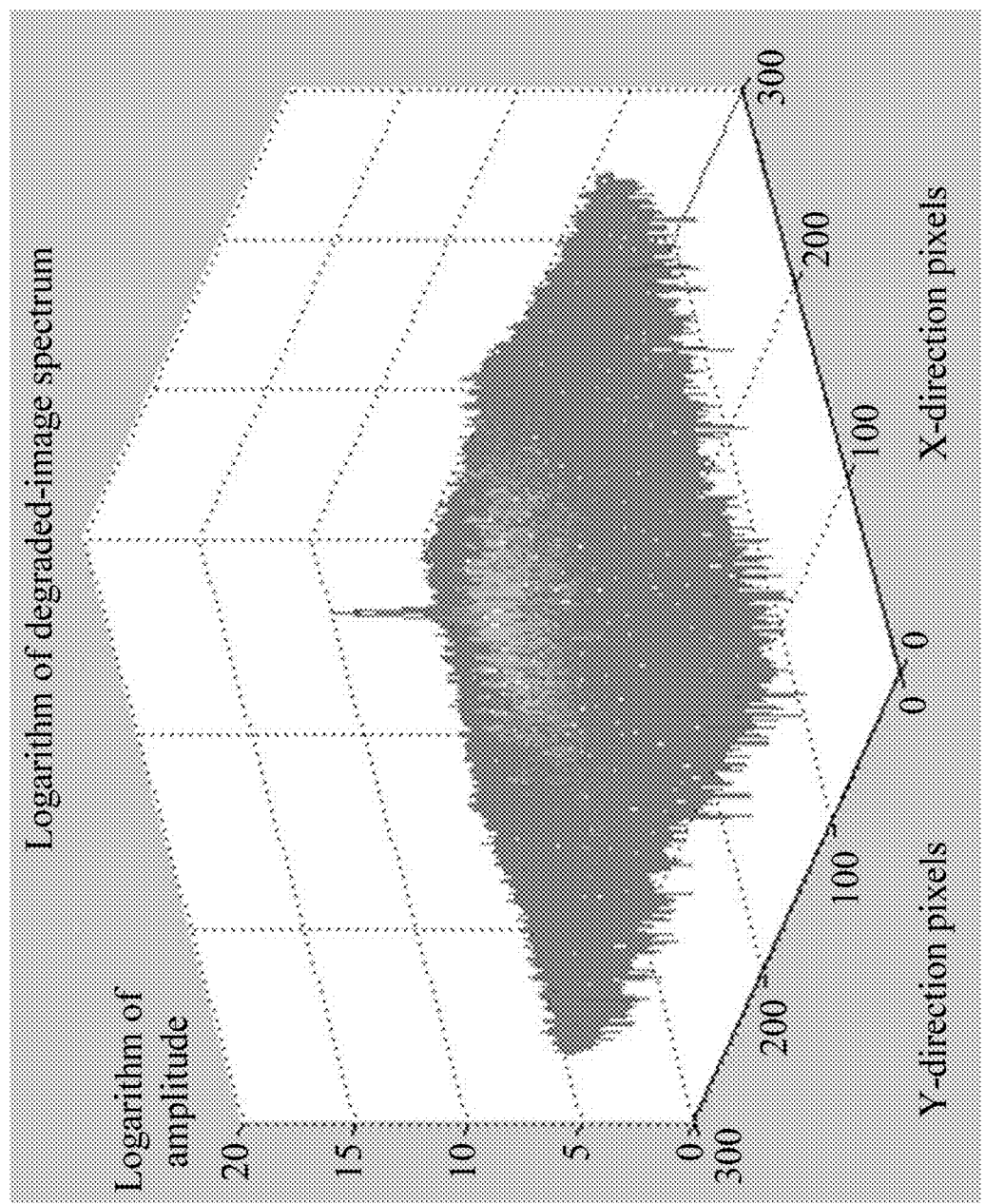
FIG. 10 shows the centralized spectrum F of FIG. 9.
Figure 11:
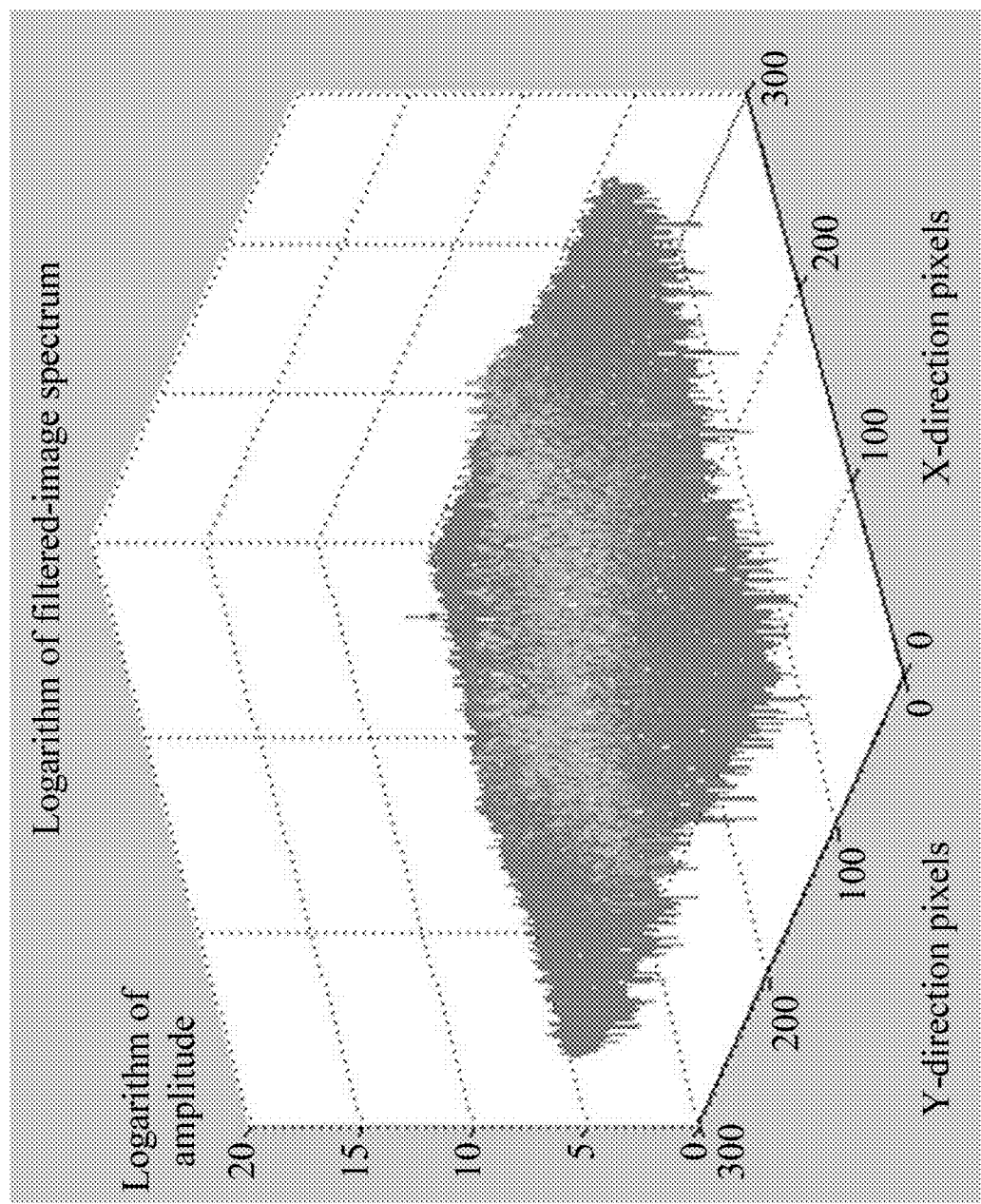
FIG. 11 shows the spectrum G of the real-time filtered image.
Figure 12:
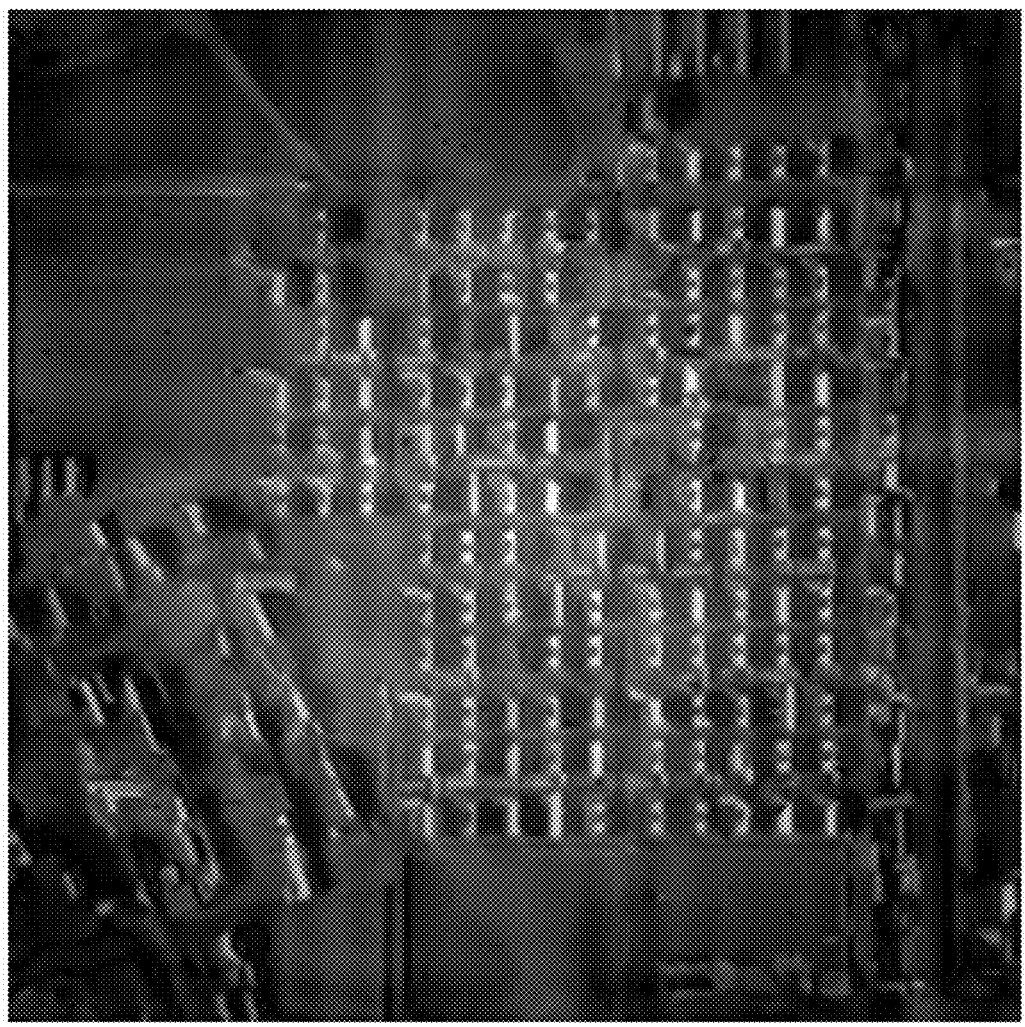
FIG. 12 shows the aerothermal-radiation corrected image g after frequency-domain correction of aerothermal radiation effect for FIG. 9.
Figure 13A:
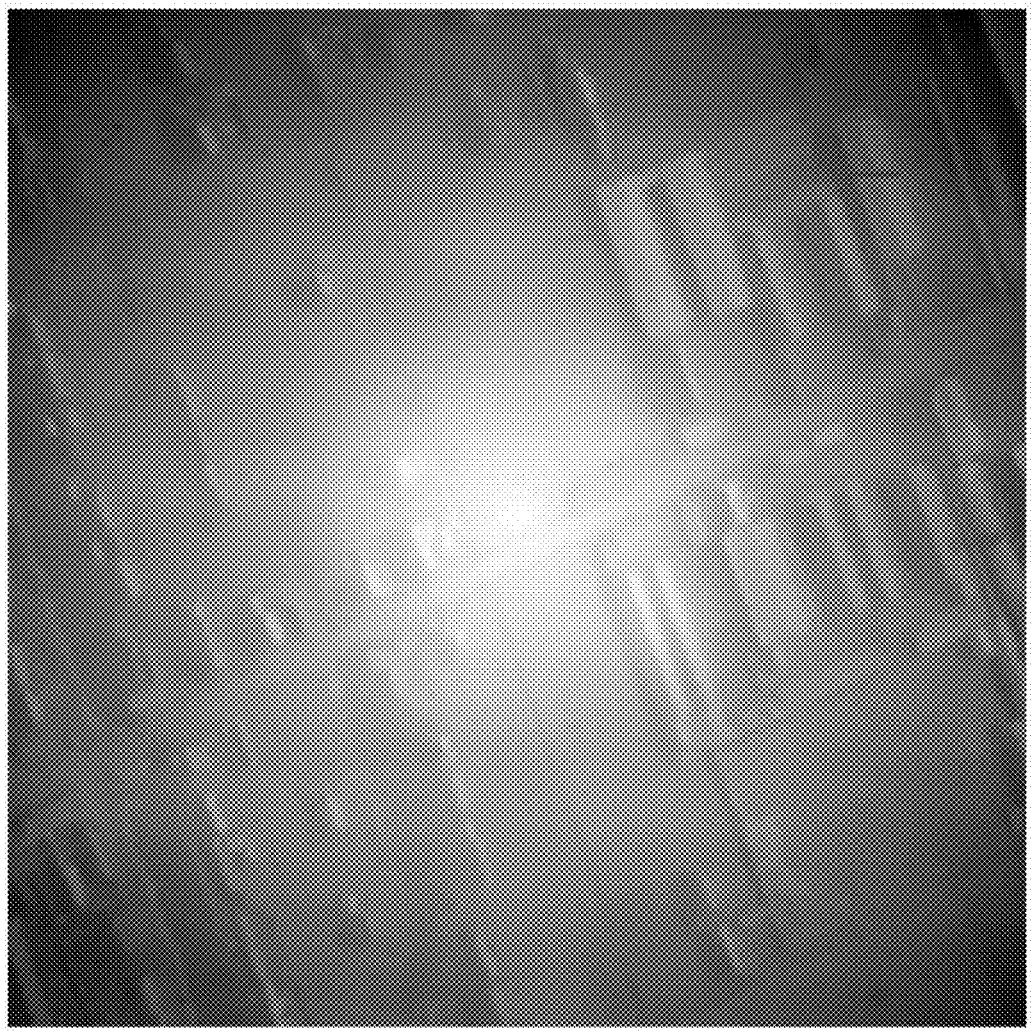
FIG. 13A shows a simulated aerothermal-radiation degraded image according to actual flight conditions, in an embodiment.
Figure 13B:
FIG. 13B shows an aerothermal-radiation corrected image obtained by using the correction method of the present disclosure for FIG. 13A, in the embodiment.
Figure 13C:
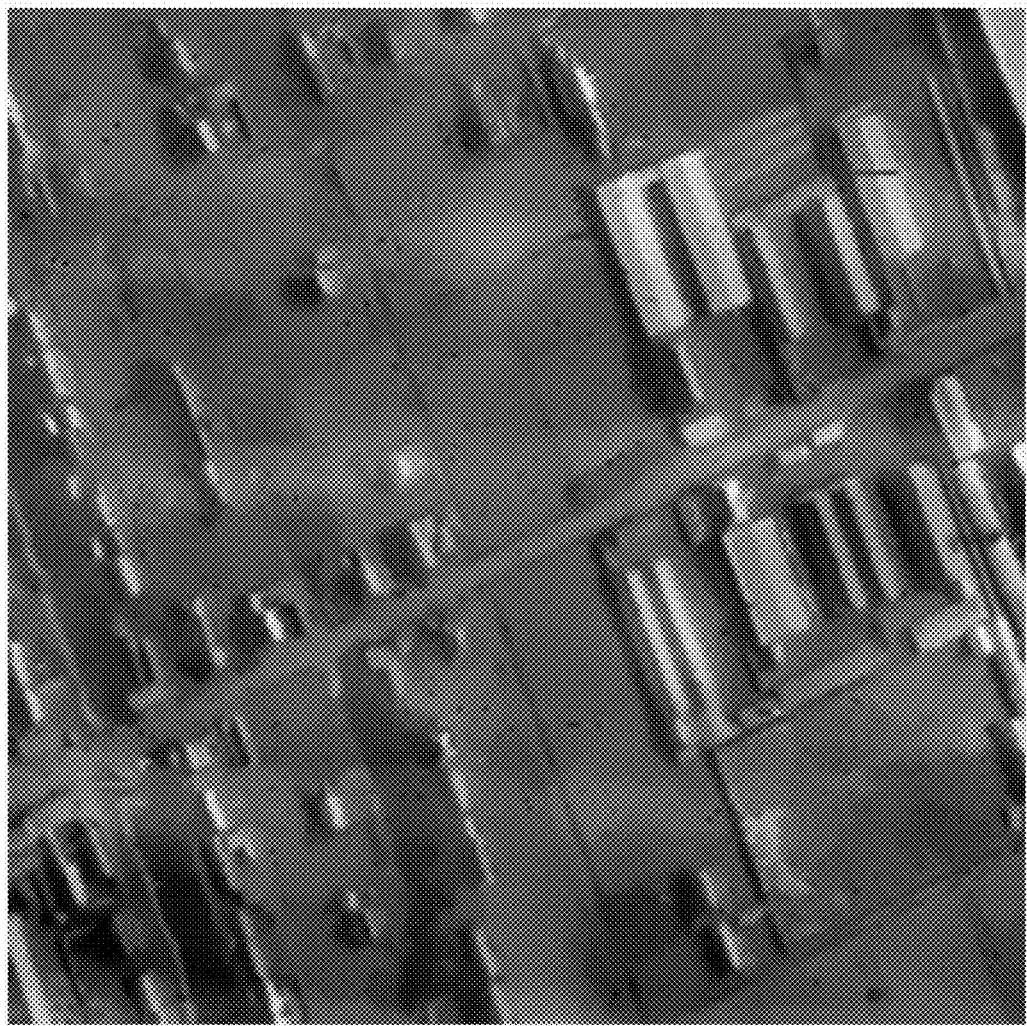
FIG. 13C is a reference image.
Figure 13D:
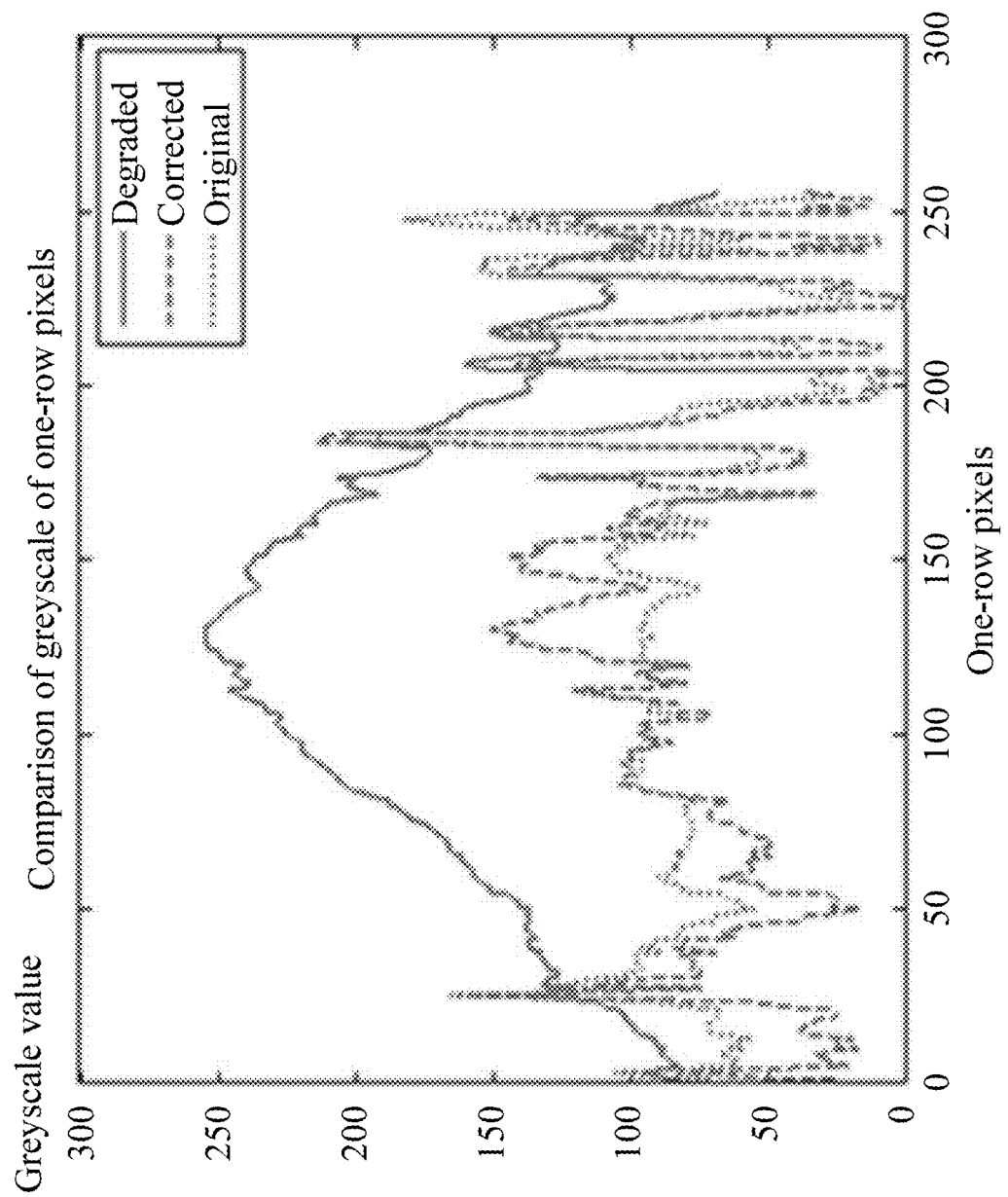
FIG. 13D shows the result of comparing the greyscale values of the same row pixels taken from FIG. 13A, FIG. 13B and FIG. 13C, respectively.
Figure 14A:
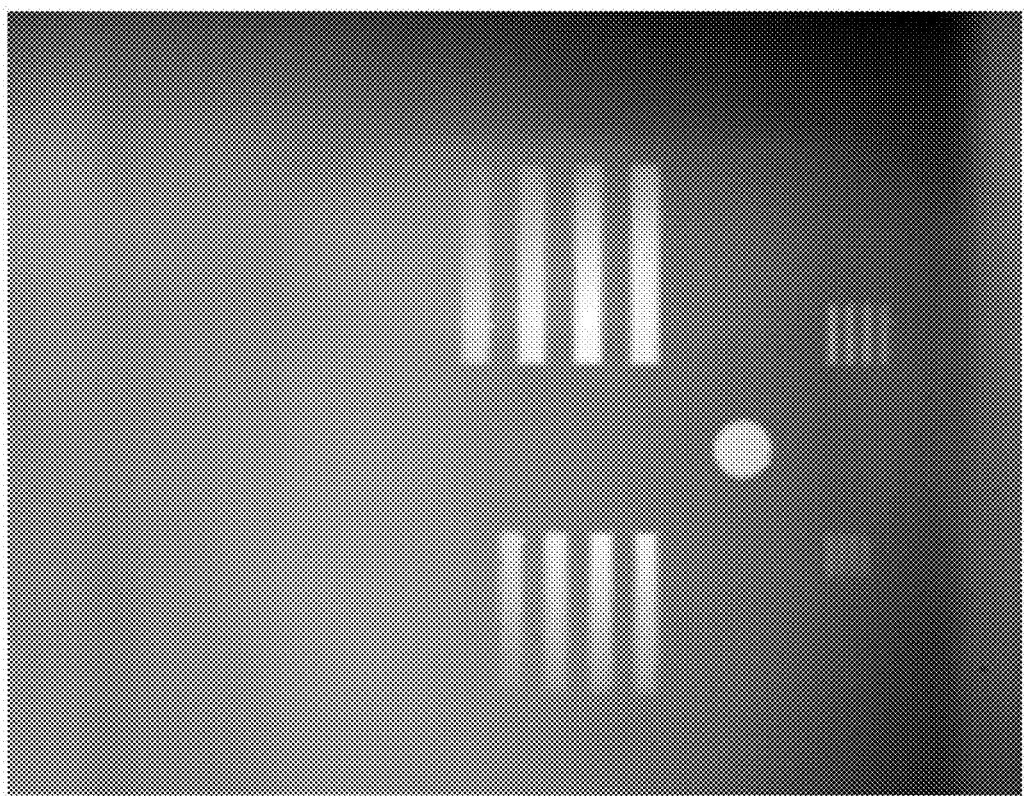
FIG. 14A is a $2000^{th}$-frame aerothermal radiation image acquired by an infrared imaging system in a wind tunnel experiment, according to an embodiment.
Figure 14B:
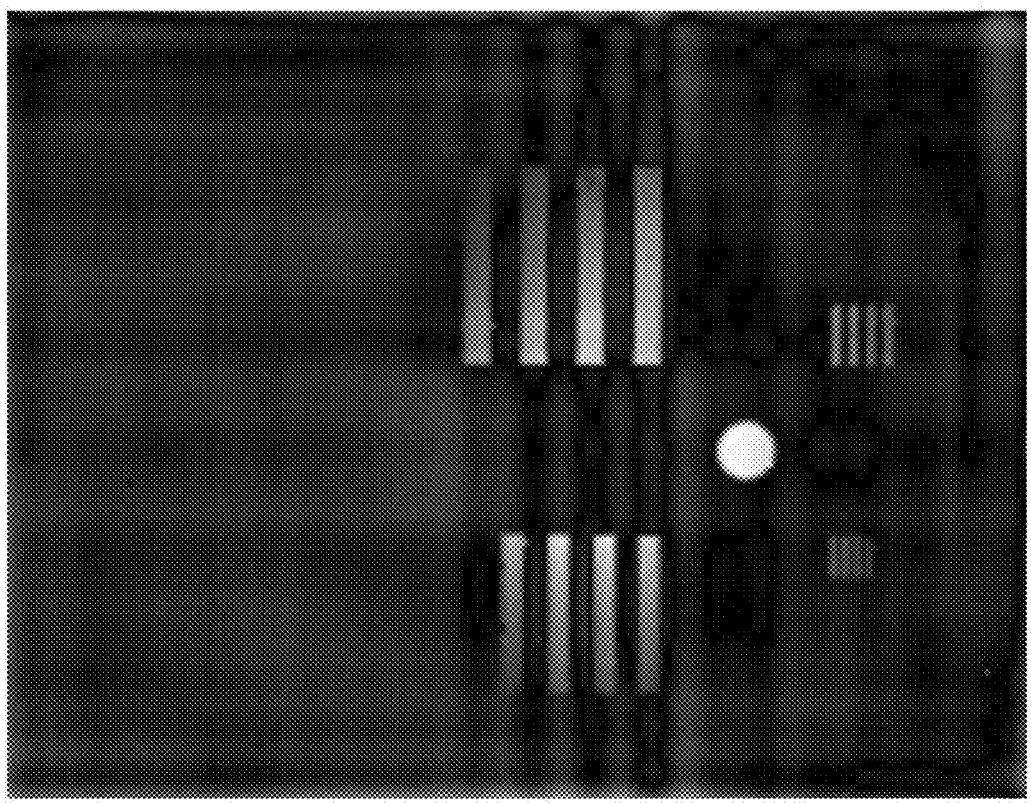
FIG. 14B is an aerothermal-radiation corrected image obtained in the embodiment by using the correction method of the present disclosure for FIG. 14A.
Figure 14C:
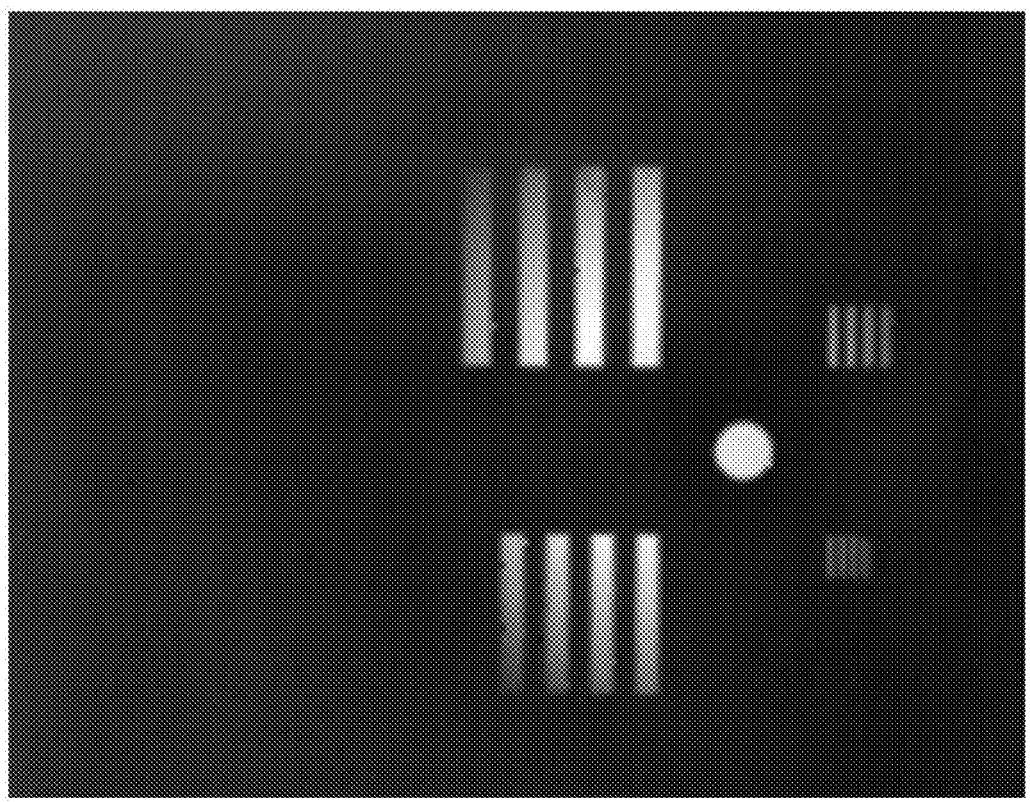
FIG. 14C is the $1^{st}$-frame image in the wind tunnel experiment in the embodiment.
Figure 14D:
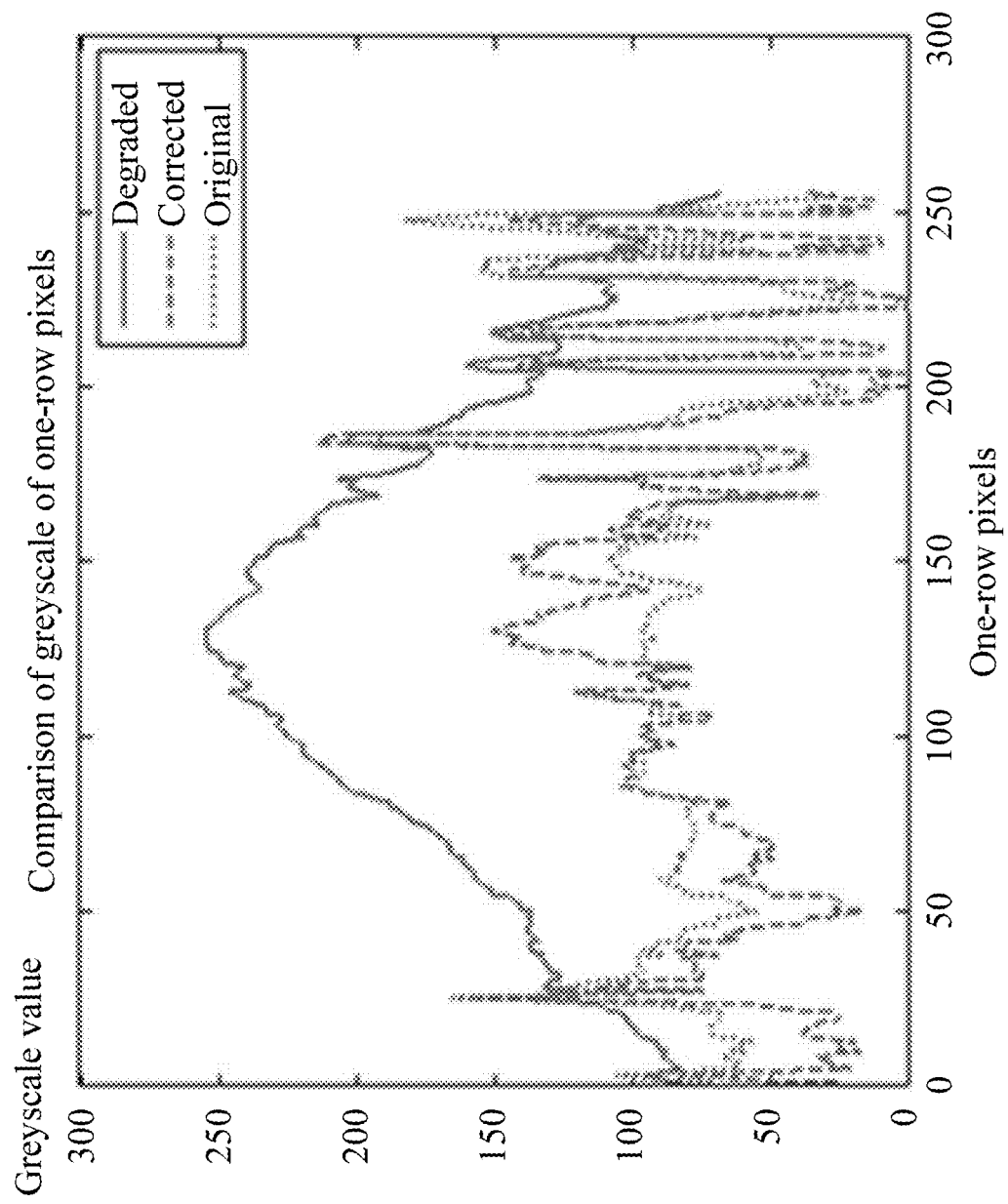
FIG. 14D shows the result of comparing the greyscale values of the same row pixels taken from FIG. 14A, FIG. 14B and FIG. 14C, respectively.
Figure 15A:
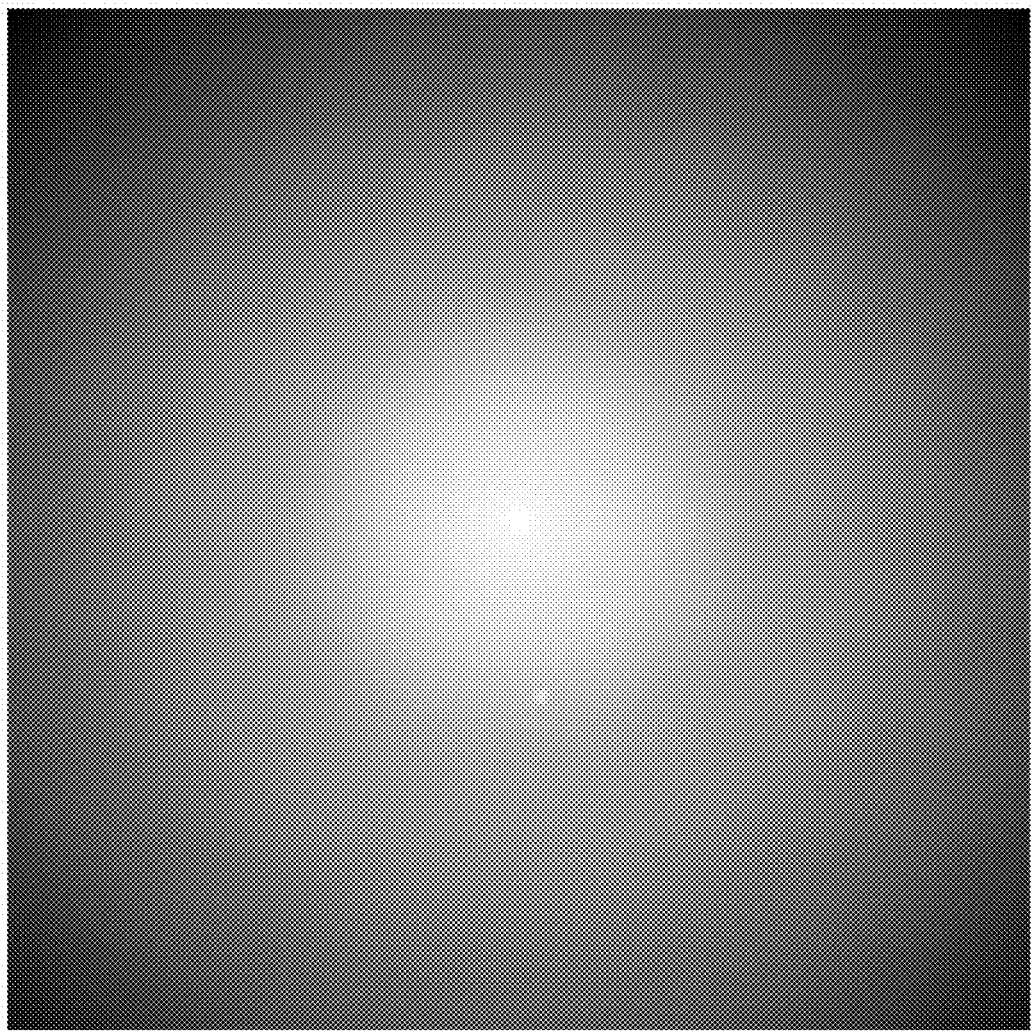
FIG. 15A is a simulated aerothermal-radiation degraded image of a simple background spot-source target, according to an embodiment.
Figure 15B:
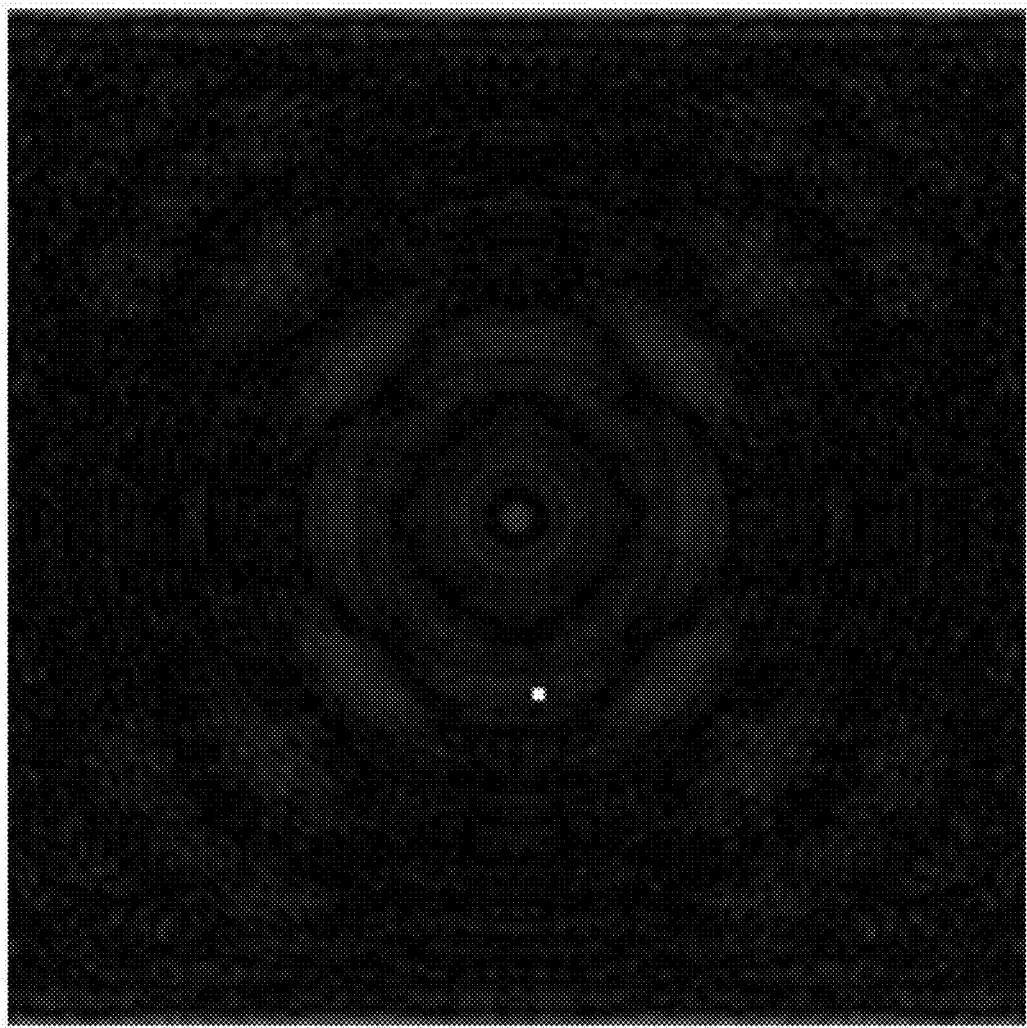
FIG. 15B is an aerothermal-radiation corrected image obtained in the embodiment by using the correction method of the present disclosure for FIG. 15A.
Figure 15C:
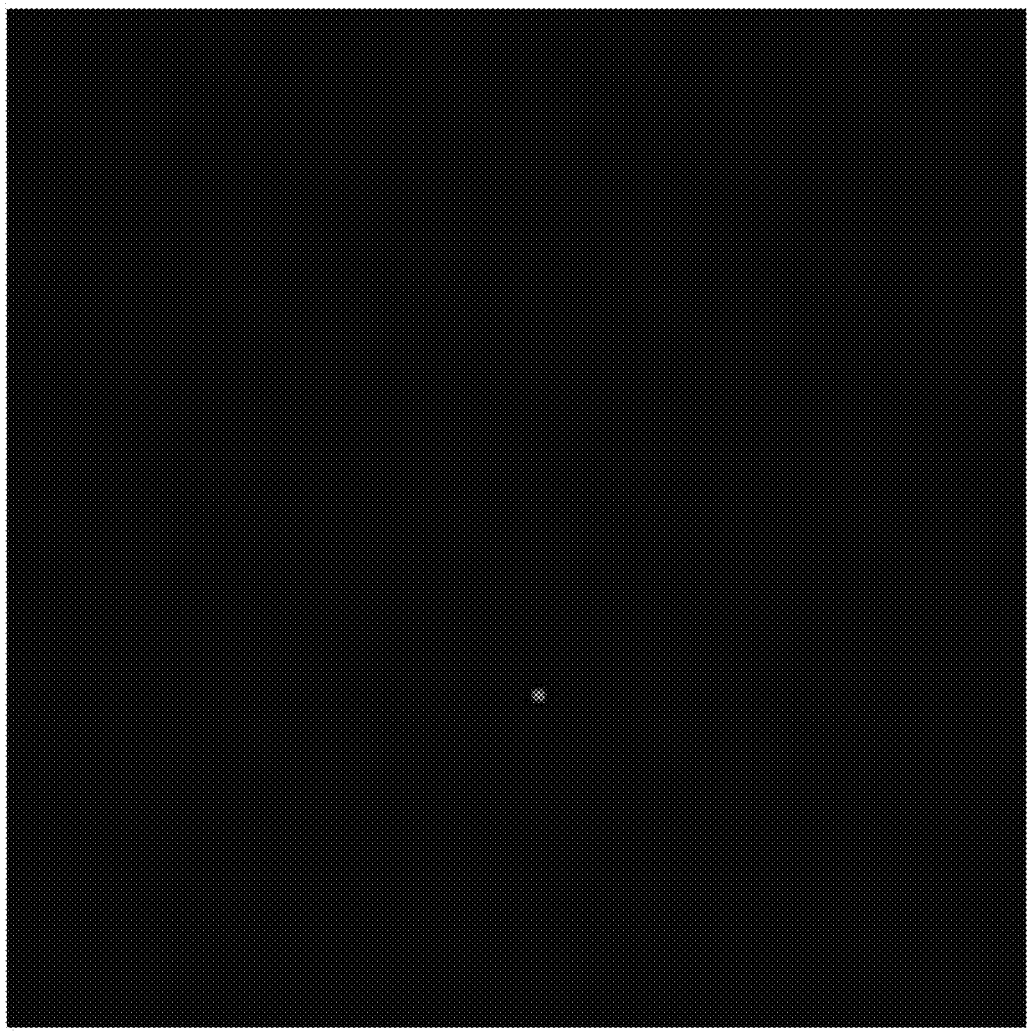
FIG. 15C is a reference image of the spot-source target.
Figure 15D:
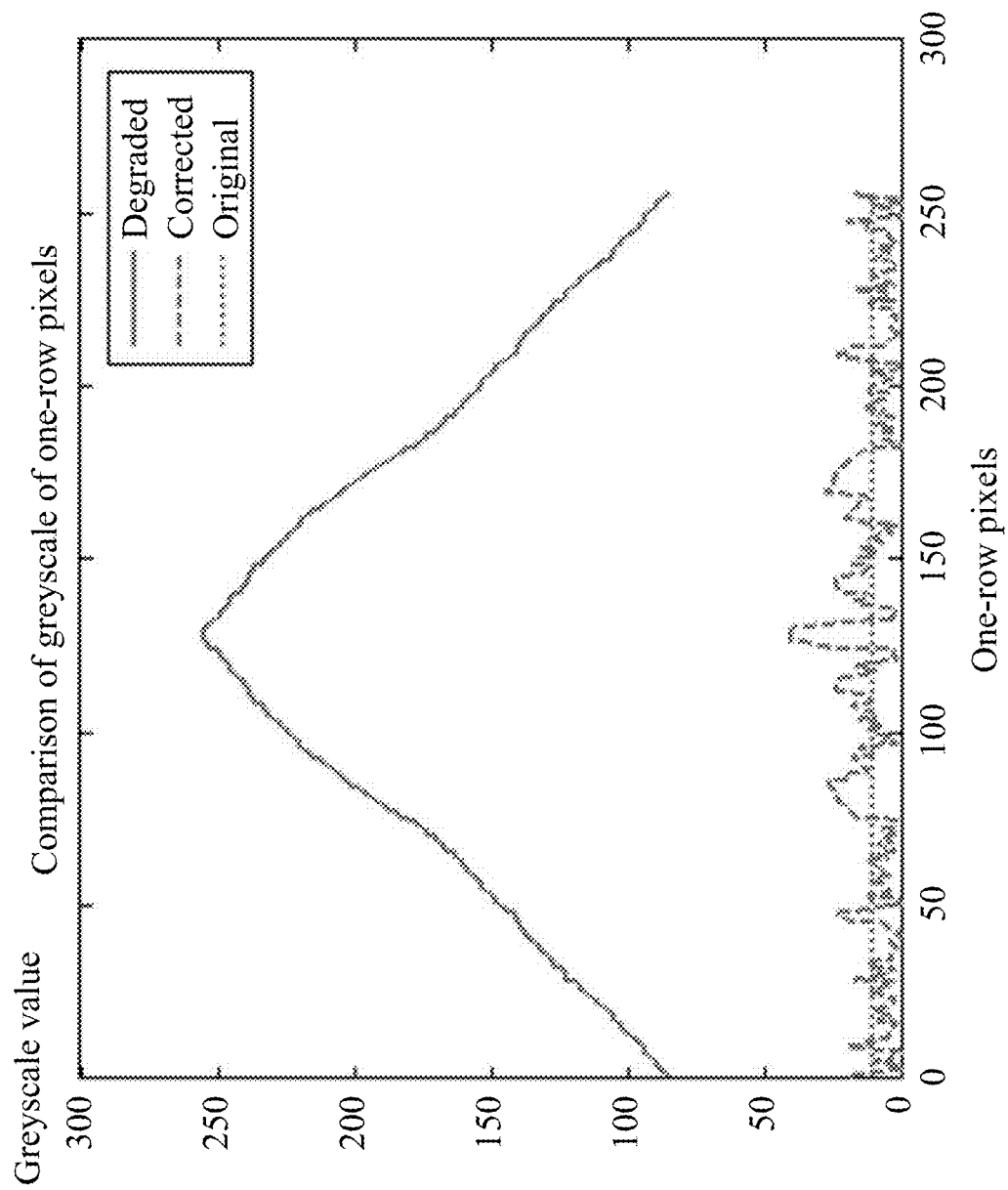
FIG. 15D shows the result of comparing the greyscale values of the same row pixels taken from FIG. 15A, FIG. 15B and FIG. 15C, respectively.

Specifically, the threshold-based segmentation to the normalized amplitude spectrum N comprises the following process: for every point $\overline{N(u,v)}$ in the normalized amplitude spectrum N, if $\overline{N(u,v)} \geq \gamma$, then setting the corresponding point in the filtering-mask constraint BW to be BW(u,v)=0; otherwise, setting BW(u,v)=1. The result B of the threshold-based segmentation is as shown in FIG. 5;

(3-4) based on the obtained filtering-mask constraint BW, establishing the filter function H of which a three-dimensional view is as shown in FIG. 6, the filter function is specifically as follows:

$$H(u, v) = \begin{cases} 1 & BW(u, v) = 1 \\ \lambda & BW(u, v) = 0 \end{cases}$$

wherein, BW(u,v) represents an arbitrary point on BW; H(u,v) represents an arbitrary point on the filter function H, and (u,v) represents coordinates of the point; λ represents the degree in which the aerothermal-radiation noise is being filtered out, and its value is in the range of 0-1. The smaller λ, the higher degree the aerothermal-radiation noise is filtered out, and the appropriate value of λ may be selected according to the intensity of the aerothermal radiation noise, and in this embodiment, λ=0.05;

(4) obtaining a spectrum of the aerothermal-radiation degraded image f by performing Fourier transform to the aerothermal-radiation degraded image f, followed by performing spectrum centralization to the spectrum of the aerothermal-radiation degraded image f to obtain a centralized spectrum F of the aerothermal-radiation degraded image, as shown in FIG. 10;

(5) filtering out spectral components for the aerothermal-radiation noise from the centralized spectrum F by performing dot-product of the centralized spectrum F and the filter function H, to yield a filtered spectrum G of the real-time image, i.e., G=F.*H as shown in FIG. 11, so that frequency-domain filtering to f is achieved;

(6) obtaining a centralized filtered spectrum of the real-time image by performing spectrum centralization to the filtered spectrum G of the real-time image; obtaining image data for an aerothermal-radiation corrected image by performing inverse Fourier transform to centralized filtered spectrum of the real-time image; and performing a modulo operations to the image data for the aerothermal-radiation corrected image so to obtain the aerothermal-radiation corrected image g, as shown in FIG. 12.

In (2), (4), and (6) of the method, the spectrum centralization to a spectrum comprises: a) obtaining an amplitude spectrum for the spectrum by calculating the magnitude of the spectrum; b) equally dividing the amplitude spectrum into a 2×2 sub-blocks; and c) interchanging every two diagonal sub-blocks of the 2×2 sub-blocks.

Based on steps described above, three groups of different aerothermal-radiation degraded images are processed, respectively, to verify the present disclosure, and the result is as shown in FIGS. 13-15.

TABLE 1

|  | PSNR (after aerothermal radiation degradation) | PSNR (after frequency-domain correction) | Time consumption |
| --- | --- | --- | --- |
| Image 1 | 11.7837 | 15.9239 | 0.0761 s |
| Image 2 | 9.0293 | 21.6188 | 0.0676 s |
| Image 3 | 6.3180 | 26.9207 | 0.0776 s |

As can be derived from comparison of the data in Table 1, the correction algorithm of the present disclosure can significantly improve peak signal-to-noise ratio of aerothermal-radiation degraded images, thus can effectively solve the problem of aerothermal radiation effect. The time consumption is obtained by running the algorithm of the present disclosure on MATLAB.

Figure 16:
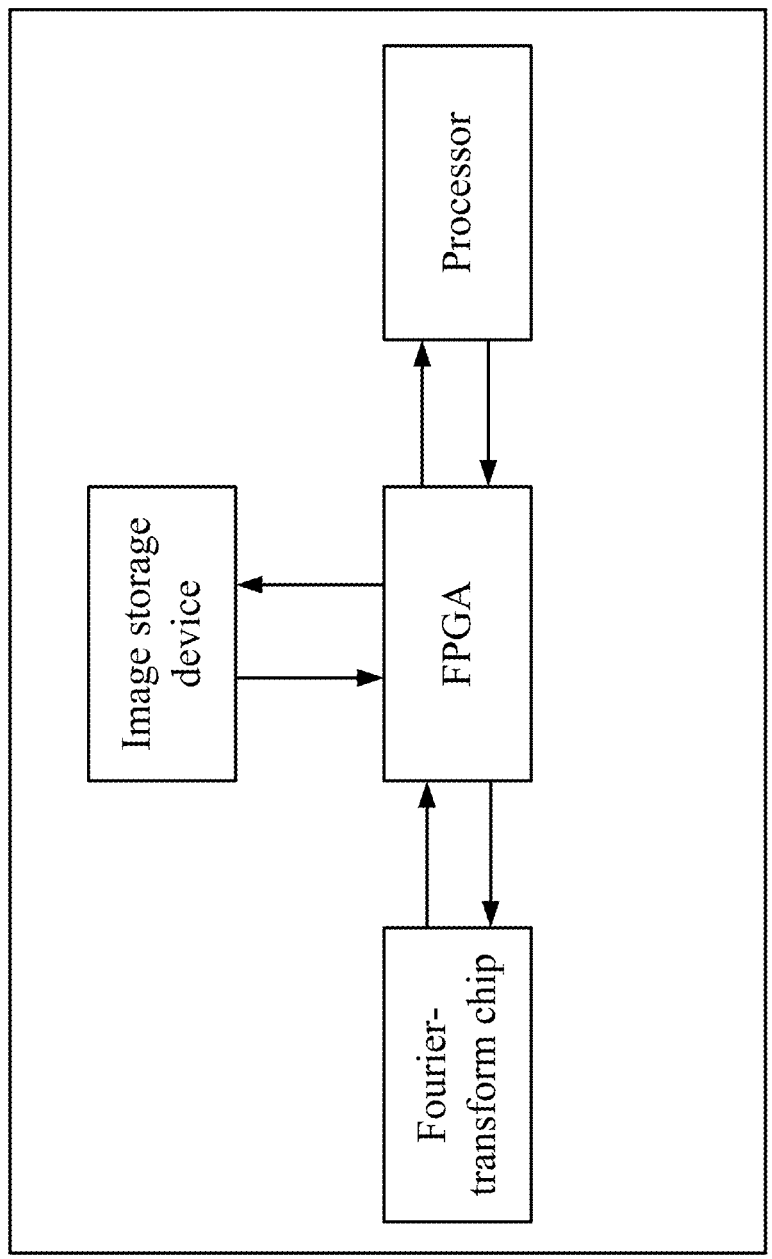
FIG. 16 shows the system for correcting the aerothermal radiation, according to the present disclosure.

In addition, the invention provides a system for correcting the aerothermal radiation in the frequency domain, as shown in FIG. 16, the system comprises an image storage device, a field-programmable gate array (FPGA), a processor, and a Fourier-transform chip. In the system, the image storage device functions to store the aerothermal-radiation degraded image f. In addition, the processor functions to construct the Gaussian curved-surface b; to perform spectrum centralization to various spectrum; to establish the filter function H; to perform dot-product of the centralized spectrum F of the aerothermal-radiation degraded image f and the filter function H so as to yield the filtered spectrum G of a real-time image; and to perform modulo operations to the image data for the aerothermal-radiation corrected image that are obtained from the inverse Fourier transform so as to yield the aerothermal-radiation corrected image. In addition, the Fourier-transform chip functions to perform Fourier transform and inverse Fourier transform. In addition, the FPGA functions to communicate between the image storage device, the processor, and the Fourier-transform chip.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for correction of aerothermal radiation, the method comprising:
   1) acquiring an aerothermal-radiation degraded image f from an image storage device;
   2) transmitting the aerothermal-radiation degraded image f from the image storage device to a processor via a field-programmable gate array (FPGA), and constructing a Gaussian curved-surface b that represents a spectral distribution of aerothermal-radiation noise in the aerothermal-radiation degraded image f in the processor; transmitting the Gaussian curved-surface b from the processor to a Fourier-transform chip via the FPGA, and obtaining a spectrum of the aerothermal-radiation noise in the Fourier-transform chip by performing Fourier transform to the Gaussian curved-surface b; and transmitting the spectrum of the aerothermal-radiation noise from the Fourier-transform chip to the processor via the FPGA, and obtaining a centralized spectrum B of the aerothermal-radiation noise in the processor by performing spectrum centralization to the spectrum of the aerothermal-radiation noise;

3) establishing a filter function H in the processor based on the centralized spectrum B of the aerothermal-radiation noise;

4) transmitting the aerothermal-radiation degraded image f from the image storage device to the Fourier-transform chip via the FPGA, and obtaining a spectrum of the aerothermal-radiation degraded image f by performing Fourier transform to the aerothermal-radiation degraded image f in the Fourier-transform chip; transmitting the spectrum of the aerothermal-radiation degraded image f from the Fourier-transform chip to the processor via the FPGA, and obtaining a centralized spectrum F of the aerothermal-radiation degraded image f in the processor by performing spectrum centralization to the spectrum of the aerothermal-radiation degraded image f;

5) filtering out spectral components for the aerothermal-radiation noise from the centralized spectrum F of the aerothermal-radiation degraded image f in the processor by performing dot-product of the centralized spectrum F of the aerothermal-radiation degraded image f and the filter function H, to yield a filtered spectrum G of a real-time image; and 6) obtaining a centralized filtered spectrum of the real-time image in the processor by performing spectrum centralization to the filtered spectrum G of the real-time image; transmitting the centralized filtered spectrum of the real-time image from the processor to the Fourier-transform chip via the FPGA, and obtaining image data for an aerothermal-radiation corrected image in the Fourier-transform chip by performing inverse Fourier transform to the centralized filtered spectrum of the real-time image; transmitting the image data for the aerothermal-radiation corrected image from the Fourier-transform chip to the processor via the FPGA, and obtaining the aerothermal-radiation corrected image in the processor by performing modulo operations to the image data for the aerothermal-radiation corrected image;

wherein the spectrum centralization to a spectrum comprises:
a) obtaining an amplitude spectrum for the spectrum by calculating a magnitude of the spectrum;
b) equally dividing the amplitude spectrum into a 2×2 sub-blocks; and
c) interchanging every two diagonal sub-blocks of the 2×2 sub-blocks.

2. The method of claim 1, wherein in 2), the aerothermal-radiation-noise Gaussian curved-surface b is constructed in the same size as the aerothermal-radiation degraded image f, by first acquiring a size m×n of the aerothermal-radiation degraded image f, and constructing the aerothermal-radiation-noise Gaussian curved-surface b via a Gaussian function $$\text{gaussian}(m, n) = e^{\frac{-(m^2+n^2)}{2\sigma^2}},$$

wherein m and n represent rows and columns of the Gaussian function, respectively, and σ represents a standard deviation.

3. The method of claim 1, wherein 3) comprises:
(3-1) obtaining an amplitude spectrum $\overline{B}$ of the centralized spectrum B of the aerothermal-radiation noise, wherein $\overline{B}=|B|$;
(3-2) normalizing the amplitude spectrum $\overline{B}$ to obtain a normalized amplitude spectrum N, and drawing a histogram Hist(x) of the normalized amplitude spectrum N, wherein an abscissa x of the histogram Hist(x) represents a normalized amplitude value;
(3-3) estimating a segmentation threshold γ according to the histogram Hist(x), and obtaining a filtering-mask constraint BW by segmenting the normalized amplitude spectrum N according to the segmentation threshold γ, wherein a value of the segmentation threshold γ is in the range of 0-1; and
(3-4) establishing a filter function H based on the filtering-mask constraint BW as follows:

$$H(u, v) = \begin{cases} 1 & BW(u, v) = 1 \\ \lambda & BW(u, v) = 0 \end{cases}$$

wherein, BW(u,v) represents a point on the filtering-mask constraint BW; H(u,v) represents a point on the filter function H, and (u,v) represents coordinates of the point; λ represents a degree in which the aerothermal-radiation noise is filtered out, and λ is in the range of 0-1.

4. The method of claim 3, wherein the filtering-mask constraint BW is obtained by: for every point $\overline{N(u,v)}$ in the normalized amplitude spectrum N, if $\overline{N(u,v)} \geq \gamma$, then setting the corresponding point in the filtering-mask constraint BW to be BW(u,v)=0; otherwise, setting BW(u,v)=1.

5. The method of claim 1, wherein the filtering-mask constraint is a binary-mask constraint.

6. The method of claim 2, wherein the filtering-mask constraint is a binary-mask constraint.

7. The method of claim 3, wherein the filtering-mask constraint is a binary-mask constraint.

8. The method of claim 4, wherein the filtering-mask constraint is a binary-mask constraint.

* * * * *